SCANNING SYSTEM FOR COLOR TELEVISION

Filed May 12, 1947 2 SHEETS—SHEET 1

INVENTOR,
GEORGE E. SLEEPER JR.
BY Donald K. Lippincott
ATTORNEY.

July 15, 1952 G. E. SLEEPER, JR 2,603,706

SCANNING SYSTEM FOR COLOR TELEVISION

Filed May 12, 1947 2 SHEETS—SHEET 2

INVENTOR,
GEORGE E. SLEEPER JR.
BY Donald K. Lippincott
ATTORNEY.

Patented July 15, 1952 2,603,706

UNITED STATES PATENT OFFICE 2,603,706

SCANNING SYSTEM FOR COLOR TELEVISION

George E. Sleeper, Jr., Berkeley, Calif., assignor to Color Television, Inc., San Francisco, Calif., a corporation of California Application May 12, 1947, Serial No. 747,452

1 Claim. (Cl. 178—5.2)

My invention relates to color television systems, and particularly to apparatus and methods for scanning the multiple primary color images into which the full color image is divided for transmission, or from which the full color image is synthesized in reception. The invention is related to my prior Patent No. 2,389,645, and is for certain purposes an improvement thereon.

The primary purpose of my invention is to provide a television system which will transmit and receive full color images without the necessity of extra synchronizing or displacing pulses not required for black and white transmissions, and without any complications of the electrical circuits beyond that required for black and white. Specifically, among the objects of the invention are to provide means for color scanning which are readily adjustable to give any desired sequence of scansion whatever within the color period, whether by different colors in successive lines, different colors in successive frames, or retrace of the same line with different colors before proceeding to the next, and with straight sequential or two to one, three to one or other interlace, all without adjustment other than can be satisfactorily made by the ordinary user of television receiver.

Another object of my invention is to provide a color television system which can easily and simply be converted to black and white reception by minor and easily made adjustment.

A further object of my invention is to provide a color television receiver which is wholly electronic, but which will work equally well on signals transmitted by semi-mechanical or color-drum or color-disk systems.

Still another object of my invention is to provide a color television method which is equally applicable to transmission and reception.

Other objects and advantages of my invention will become apparent by reference to the ensuing description and the accompanying drawings, wherein.

Figure 1:
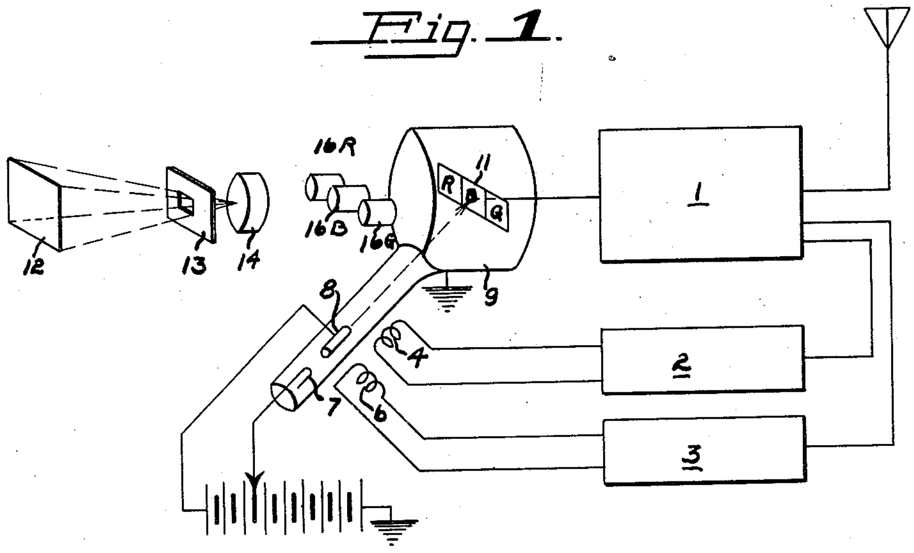
Figure 1 is a schematic diagram of my invention as applied to a transmitter.

All color television systems evolved to date involve the formation, either simultaneously or successively, of a plurality of images of the single component colors which combine to form the varied hues of the whole. These images are scanned separately (again, either simultaneously or successively) to produce signal trains representative of the single-component images, which are reproduced at the receiver in their appropriate colors, usually by filtering out the other components from white light, and the reproduced images are recombined in an optical system or by the eye to give a more or less faithful reproduction of the original. While many combinations of two, three or more component images of various colors are possible, good reproduction with maximum economy of signals has led to the practically universal use of three images, with red, blue and green as the primary colors, and in the ensuing description it will be assumed that this fundamental procedure is followed, while recognizing that others will also give comparable results.

In the system of this invention the component images are formed simultaneously, although the signals representing them are sent one color at a time. The processes of transmission and reception are reciprocal; at the transmitter the light is collected by a single element, split, filtered of all except the desired component colors, and distributed to form three images (which would be substantially identical were the filters removed) on a picture screen, in this case photoelectric, which is scanned vertically and horizontally to produce the signals. At the receiver the three component images are formed on a picture screen, which in this case is fluorescent, by a scanning sequence identical with that at the transmitter. The elements of the optical system can be substantially the same as in the transmitter, except in dimension and focal length, but in this case the light "distributors" of the transmitter act as light collecting elements, and the "collector" of the transmitter combines and projects the light. As a matter of nomenclature, however, the transmitter terminology will be used herein; the single element being referred to as a "collector" whether its actual use is at a transmitter to collect light or at a receiver to project it.

Considered broadly, my invention comprises means for and the method of forming the usual plurality of images simultaneously and disposed on the picture surface side-by-side, with their centers approximately on the axis of the line scansion, so that with sufficiently wide scanning amplitude the cathode ray beam will sweep across all of the image fields. The light "distributing" elements are preferably made adjustable, so that the centers of the image fields can be displaced slightly above or below the axis, the magnitude of the displacement being of the order of magnitude of the interval between successive scanning lines, but such an adjustment can be built into the equipment permanently if desired. For example, if the first image is displaced ⅔ of the line interval above the axis, and the third image is displaced the same distance below the axis, the cathode ray will traverse each image in the same relative position, scanning the same line in each color successively, and similarly with succeeding lines. As a result the images will be formed on the picture screen at the receiver in the same slightly stepped relation.

The "distributing" elements of the receiver (in this use actually serving as collectors) are displaced in the same manner, with the result that the three images blend into a single projected image in full color, and because of the scanning schedule there is no color flicker, since each line is built up in full color before the next is scanned. Other types of displacement will give other scanning sequences, and any type of interlace can be accommodated without any major alterations of equipment, and without the necessity of transmitting any additional synchronizing or displacing pulses beyond those required for black and white television.

Considered in detail, the transmitter set-up shown diagrammatically in Fig. 1 comprises the usual radio transmitter 1 for generating and modulating a radio carrier and for supplying synchronizing pulses to the vertical and horizontal scanning generators 2 and 3, which feed the deflecting coils 4 and 6 respectively. These coils deflect a cathode ray, generated by an electron gun comprising cathode 7 and anode 8 of a camera tube 9, across a photo-electric picture screen 11. All of this is in accordance with standard practice, and is illustrative merely; almost any of the known types of camera tube may be used.

The optical system diagrammed has been chosen for simplicity of illustration. The picture field to be transmitted is represented by a rectangle 12, which is delimited by a diaphragm or mask 13, and which may be at any distance from the camera tube and the optical system, depending on the focal length of the lens and the type of picture to be transmitted, e. g., whether "live talent" or film.

Behind the mask 13 is the light collector 14, in this case a lens which renders parallel the rays from the field 12, and behind the lens 14 are the three distributor lenses 16R, 16B and 16G, which, with their included filters, project the red, blue and green images R, B and G, respectively, on the picture screen. If the elements are properly designed and positioned the three images will be centered on the optical axes of the distributing elements, and if the mask is placed properly the three images will be in contact, side-by-side, with no overlapping. Tilting the axis along which the distributing elements are mounted will raise one of the side images and drop the other, but will not, of course, rotate the images themselves.

Figures 2, 7:
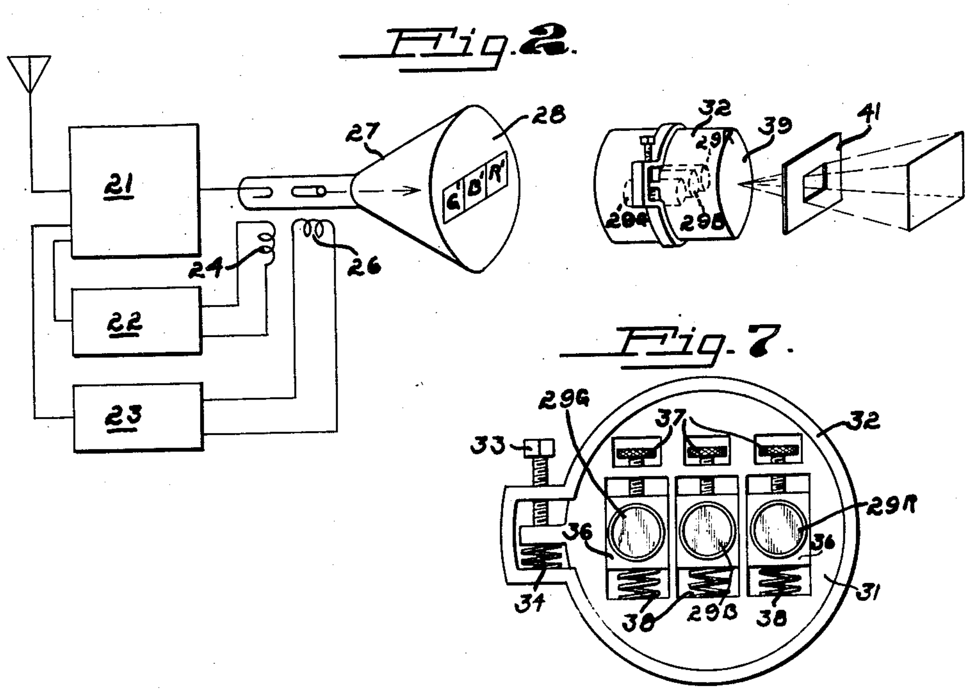
Figure 2 is a similar diagram of a television receiver.
Figure 7 is a semi-diagrammatic showing of an optical system adapted for use with my invention, showing methods of adjusting the color frames.

The application of the invention to a receiver is shown schematically in Fig. 2, wherein the block 21 represents a substantially standard television receiver which must, however, be provided with amplifiers of sufficiently wide pass band to accommodate the frequencies required for color transmission. The receiver amplifies and demodulates the signals and passes on the synchronizing pulses to the horizontal and vertical scanning oscillators represented by the blocks 22 and 23, the oscillators feeding the deflecting coils 24 and 26. The cathode-ray tube 27 must have a fluorescent picture screen 28 which, when excited, has a sufficiently rich spectrum to supply the component colors of the red, blue and green filters in the transmitter with enough brilliancy for projection, but such tubes are known in the art and do not form the subject matter of this invention. Alternatively, the tube used may employ a screen which has sections which fluoresce in the component colors, as is also known in the art.

The optical system is essentially the same as that already described, but is shown with still greater detail in Fig. 7, but since this invention is not directed to the optical system itself, greater clarity has been sought by making all showings somewhat diagrammatic.

The three light "distributors" 29R, 29B and 29G, which in this instance actually function as collectors of light from the three images R′, B′ and G′ on the screen, are mounted on a reticule plate 31 which is rotatably mounted in the lens tube 32, and can be micrometrically shifted by a tangent screw 33 working against a spring 34. As shown, each of the distributing lenses is mounted in a sliding block 36, and is adjustable by a micrometer screw 37, working against a spring 38. It should be noted that the latter means of adjustment is actually sufficient for nearly all purposes, and that the tangent adjustment could therefore be omitted. The micrometer screws 37 permit separate positioning of the lenses, and therefore are more flexible than the tangent screw. However, when the three lenses have once been positioned on a diameter of the plate 31 by the screws 37, the tangent screw offers a much more convenient adjustment, for most scanning sequences, to meet the needs of a particular picture. On the other hand, the micrometer screws permit variation of the distance between the optical axes of the lenses, and hence are valuable even should a scanning sequence be standardized upon, for which the tangent adjustment would be adequate.

The optical system is completed by the collector lens 39 and the mask 41. The mask is not an actual necessity in the receiver, but if it is not used the full color image will be flanked on one side by an image shading from blue to red through various purples, and a second all red image, and on the other by one shading from blue to green and an all green image. These distracting images are intercepted by the mask.

The operation of the invention can best be understood by reference to Figs. 3 through 6, which show various scanning sequences obtainable with it. In these figures the rectangles R, B, and G represent the fields of the red, blue and green images respectively, and the full, dash and dot lines represent successive traversals of the fields by the scanning ray in double or triple interlace systems. In order to bring out the various relationships the number of lines is greatly reduced, and the slope of the lines exaggerated.

The actual field traced out by the scanning beam in all of the sequences shown is very nearly rectangular, skewed very slightly by the drop of the interval between scanning lines in each traversal of the field. If straight sequential scanning is used this drop or skew would amount to about 0.2% of the vertical dimension of the picture; if double interlace is used it will be twice this, and with triple interlace it will be about 0.6%. The skew will not be apparent to the eye because the edges of the field scanned are masked, but even if this is not done the skew is too slight to be noticeable to most eyes.

Double interlace, i. e., scanning of the odd-numbered lines, results if $$f=F(2n+1)$$

where $f=$ the frequency of the horizontal scanning generator, $F=$ the "frame repetition" frequency, and $n$ is any integer. Triple interlace will result if $$f=F(3n+1)$$

Figure 3:
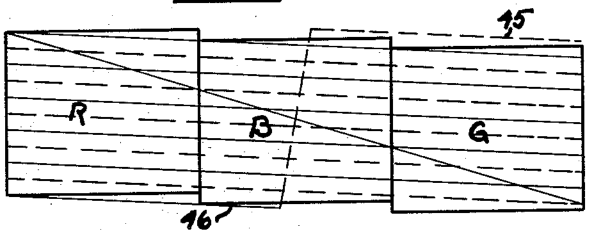
Figure 3 is a diagrammatic representation of a set of three color fields, disposed with respect to each other to give a complete color image (of one half detail) for each scansion of the field, using the present standard 2:1 interlace used with black and white television.

Double interlace is the current standard for black and white television, and Fig. 3 shows one preferred method of applying my invention to such a sequence. In this case the three light distributors 16R, 16B and 16G are disposed exactly on a diameter of the optical system, and the mask is adjusted until the three fields are almost exactly in contact. The setting of the scanning generators as to amplitude and frequency is the same as for black and white except that the horizontal amplitude is three times as great, in proportion to vertical amplitude, as in the black and white case. The tangent screw 33 is then used to tilt the axis of disposition of the distributors so that the image R is one-third of the separation between successive odd scanning lines above the horizontal, while the image G is a like distance below. The first line of scanning will therefore traverse each image in exactly the same relative position, as will each following line of both the even and odd traversals of the total field. Lines or partial lines like those numbered 45, 46, falling outside of the illuminated areas of the images will transmit "black" signals, and will show no trace on the picture screen at the receiver. The images shown there will therefore be stepped in the same fashion as those at the transmitter.

If the distributor lenses at the receiver are displaced from the axis of the line scanning to the same relative degree as those at the transmitter the three images will register perfectly, provided that the scanning wave-forms at transmitter and receiver are the same. The tangent screw offers a simple and accurate means of bringing the colors into exact register.

The scanning succession shown in Fig. 3 gives a picture in which the full color of each line is fully built up before the trace of the succeeding line is started. The same result can be effected with triple interlace in substantially the same manner, by stepping the color images ⅓ of the separation between successively traced lines, or, what is the same thing, by stepping them the distance between successive lines of the complete image. The stepping in the double interlace previously described is, of course, ½ of the distance between successive lines of the full image.

With the triple interlace it is not necessary to step or displace the images at all to get a complete color picture. This arrangement is diagrammed in Fig. 4. In this case the scanning beam in its first sweep across the entire field will trace the first line of the entire image in red, the second in blue, and the third in green, and repeat this in each successive sweep. The next scansion of the field will trace the first line in blue, the second in green, and the third in red, while the third scansion traces the first line in green, the second in red and the third in blue. This succession gives a minimum of flicker in brilliancy, since every line is traced in each of the three scansions which form the complete image, and color flicker is also slight. It does, however, require a different scanning sequence from black and white, and therefore requires greater adaptation where the same receiver is to be used for both black and white and color.

Figure 4:
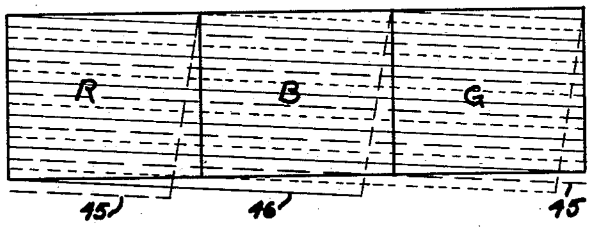
Figure 4 is a similar representative of the color fields disposed to give different color scansions between successive lines, the whole color picture being transmitted in three scansions with 3:1 interlace.
Figure 5:
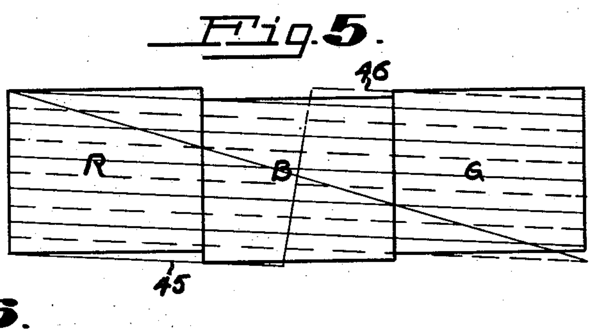
Figure 5 shows the disposal of the color fields for 2:1 interlace, to give different secondary color transmission between each pair of lines.

The sequence shown in Fig. 5 may be considered a compromise between those of Figs. 3 and 4. The interlace is double, and hence it lends itself to combination receivers, but each line, odd and even, is scanned at least once in each traversal of the total field by the scanning beam, and therefore total flicker is reduced, and color flicker is, in general, down to a satisfactorily low level. The red and green images are stepped by ⅔ of a line, exactly as in Fig. 3. The blue image, however, is raised by the space of one line above its position in Fig. 3; i. e., it is one-third of a line below the red image and the same distance above the green image. As a result the scanning sweeps which trace out the odd lines on the red and blue images will trace the even lines on the green, and vice-versa. The degree of difference in brilliancy, in any 1/60 second interval, between even and odd lines will depend on the color composition of the particular scene scanned, but neither set of lines is ever completely blank, except in the rare circumstance of one color component being completely absent, and over-all brilliancy flicker is therefore reduced. This arrangement requires, of course, the separate adjustments 37.

Figure 6:
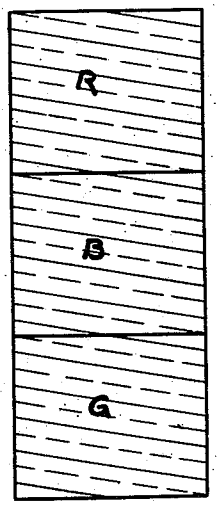
Figure 6 shows how the fields may be disposed, with the same apparatus, to give a complete frame of each color in successive scansions.

The apparatus of my invention can also be used for complete scansion of the field in each component color before going on to the next, as is done in color drum mechanical systems. To do this the light distributors are simply rotated 90° from their position in Fig. 4, as is shown in Fig. 6. No detailed description of this sequence is considered necessary.

The above descriptions have all been given in terms of present practice, insofar as this is standardized. There is no reason, of course, why the line scanning has to be horizontal and the low frequency or frame scanning vertical, and should the reverse arrangement ever be determined upon the differences required in the equipment of my invention would be limited to a 90° rotation of the light distributors and deflecting coils. The two methods of scanning are complete equivalents, and where the terms "horizontal" and "vertical" are used they are for identification under present practice, and are not to be considered as limitations. It would, in fact, be an advantage in this system to make the line scanning vertical, since this would improve the aspect ratio of the over-all field from 4:1 to 4:9. Many factors, however, enter into the problem of standardization, these factors have not yet been fully explored, and except for black and white no real standards exist. Not the least of the advantages of the system here disclosed is its flexibility. It imposes no hard-and-fast limitations of its own, but can meet the requirements of any system of sequential scanning whatsoever, and therefore will work with diverse types of transmitting or receiving equipment as the case may be, besides lending itself to procedures which are not yet well known but which may prove to have considerable advantage in general practice. During the period before permanent standards are set it therefore has a usefulness that extends even beyond its own inherent merits.

I claim:

In a color television system wherein a picture screen is scanned by a cathode ray, the method of operation which comprises the steps of forming a plurality of images representative of the component colors of the pictures side by side upon the picture screen, deflecting the cathode ray at relatively high line frequency with sufficient amplitude to traverse all of said images at each sweep, deflecting said ray at a relatively low frequency in a direction normal to said first mentioned deflection, and displacing at least one of said images in the direction of said low frequency deflection to secure a desired relationship between the lines scanned by said beam in traversing the respective images in each deflection.

GEORGE E. SLEEPER, Jr.

REFERENCES CITED

The following references are of record in the file of this patent:

UNITED STATES PATENTS

| Number | Name | Date |
|---|---|---|
| 1,312,088 | Levyman | Aug. 5, 1919 |
| 2,109,596 | Plahn | Mar. 1, 1938 |
| 2,203,520 | Cawein | June 4, 1940 |
| 2,203,528 | Harnett | June 4, 1940 |
| 2,261,762 | Hazeltine | Nov. 4, 1941 |
| 2,274,366 | Hansen | Feb. 24, 1942 |
| 2,285,470 | Stando | June 9, 1942 |
| 2,289,457 | Reichel | July 14, 1942 |
| 2,294,820 | Wilson | Sept. 1, 1942 |
| 2,335,180 | Goldsmith | Nov. 23, 1943 |
| 2,337,980 | Du Mont | Dec. 28, 1943 |
| 2,389,646 | Sleeper | Nov. 27, 1945 |
| 2,452,293 | De Forest | Oct. 26, 1948 |

FOREIGN PATENTS

| Number | Country | Date |
|---|---|---|
| 231,805 | Switzerland | July 17, 1944 |
| 562,334 | Great Britain | Oct. 6, 1943 |
| 851,375 | France | Oct. 2, 1939 |

OTHER REFERENCES

Fernseh, A. G., Band 1 Heft, August 1939, pages 171 to 178.